May 16, 1939.  W. B. SCHMIDT  2,158,731
PARACHUTE BRAKING MEANS
Filed June 25, 1938     3 Sheets—Sheet 1
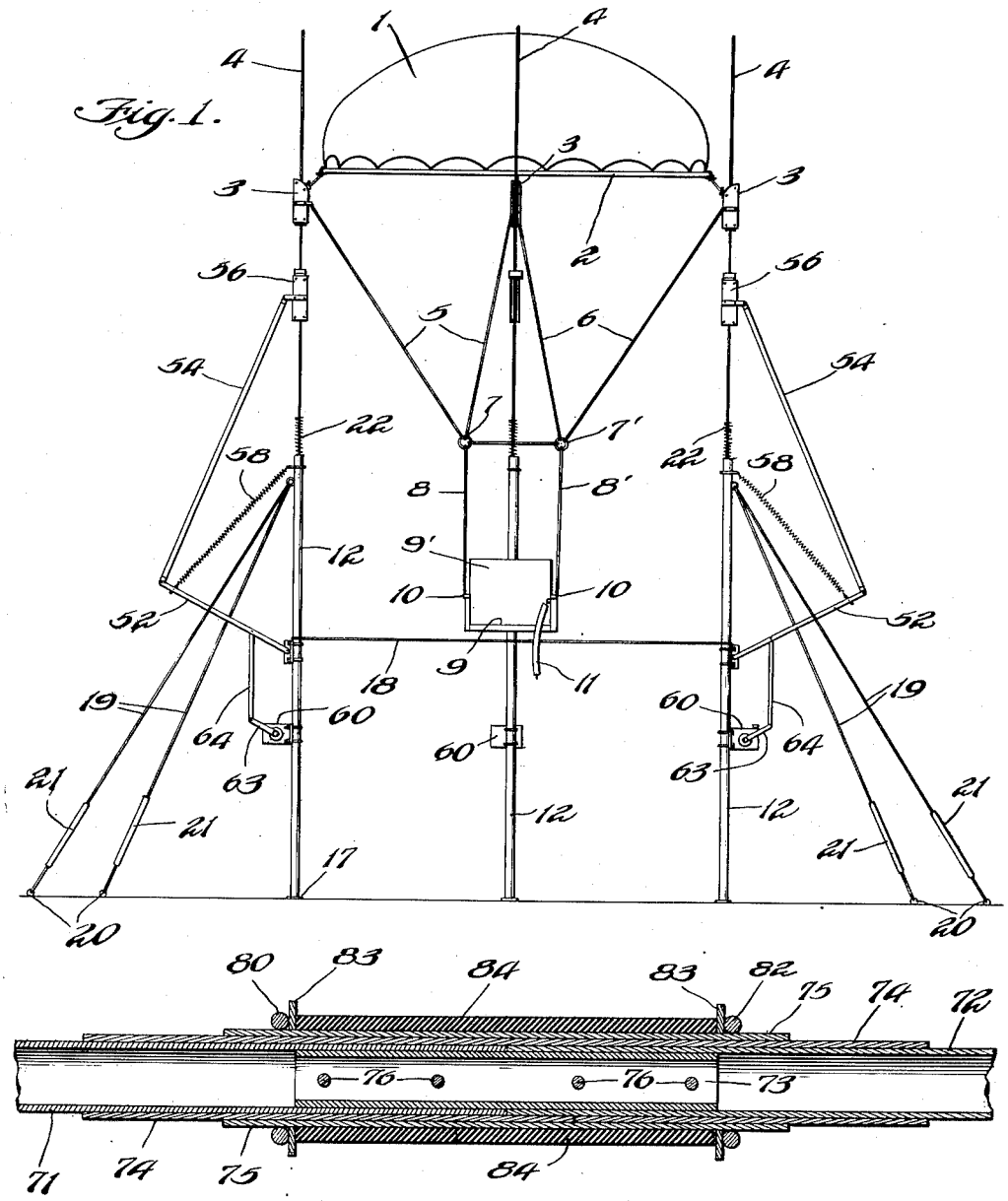
INVENTOR.
William B. Schmidt
BY George H. Simmons
ATTORNEY.

May 16, 1939.  W. B. SCHMIDT  2,158,731
PARACHUTE BRAKING MEANS
Filed June 25, 1938  3 Sheets-Sheet 2
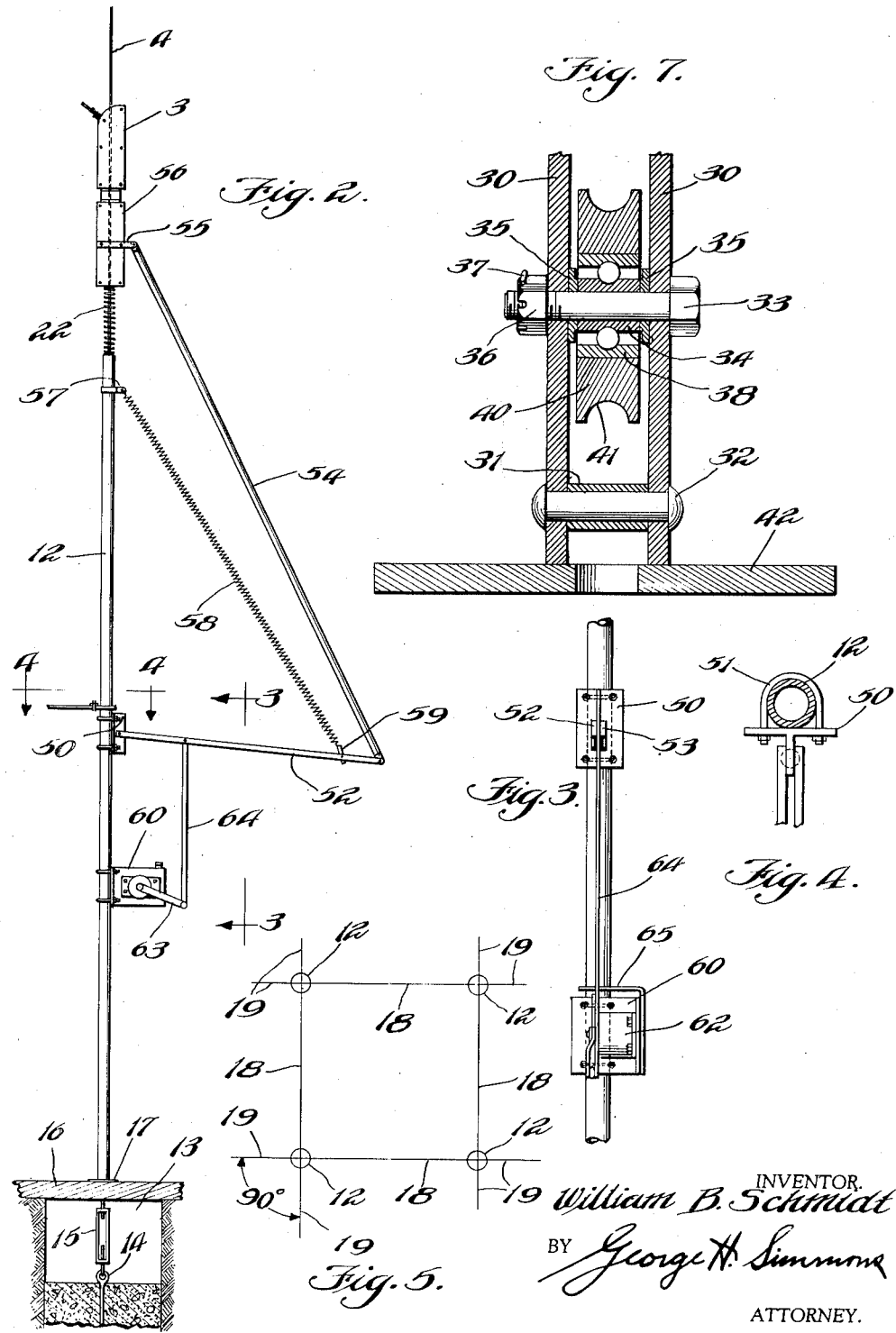

May 16, 1939.  W. B. SCHMIDT  2,158,731
PARACHUTE BRAKING MEANS
Filed June 25, 1938  3 Sheets-Sheet 3

INVENTOR.
William B. Schmidt
BY George H. Simmons
ATTORNEY.

Patented May 16, 1939

2,158,731

UNITED STATES PATENT OFFICE 2,158,731

PARACHUTE BRAKING MEANS

William B. Schmidt, Chicago, Ill.

Application June 25, 1938, Serial No. 215,746

16 Claims. (Cl. 272—6)

This invention relates to captive parachutes such as may be used for the training of parachute jumpers and for amusement purposes, and has for its principal object the provision of a new and improved device of this kind.

It is a main object of the present invention to provide braking devices adapted to engage a descending parachute at some distance above a stopping plane and to gradually retard movement of the parachute toward that plane.

Another object of the invention is to provide a braking arrangement fitted upon the guide wires and guided thereby in its movement to bring the parachute to rest.

Another object of the invention is to provide improved shoes for engaging the guide wire by which the parachute and braking devices are maintained in working relation with respect to each other.

Still another object of the invention is the provision of a new and improved rigid ring attached to the parachute and guide shoes and arranged to hold the parachute open in readiness for use.

Still further objects of the invention not specifically mentioned here will be apparent from the detailed description and claims which follow, reference being had to the accompanying drawings in which a preferred embodiment of the invention is shown by way of example and in which:

Figure 1 is a side elevational view of the parachute and braking arrangement;

Figure 2 is a fragmentary elevational view showing the braking arrangement drawn to an enlarged scale;

Figure 3 is a fragmentary elevational view taken along substantially the line 3—3 of Figure 2 looking in the direction of the arrows;

Figure 4 is a cross-sectional view taken along the line 4—4 of Figure 2 looking in the direction of the arrows;

Figure 5 is a plan view of the supports and bracing arrangements therefor;

Figure 7 is a fragmentary cross-sectional view through one of the guide pulleys of the shoe;

Figure 9 is a cross-sectional view through the rigid ring showing particularly the arrangement for distributing braking stresses therealong.

Figure 6:
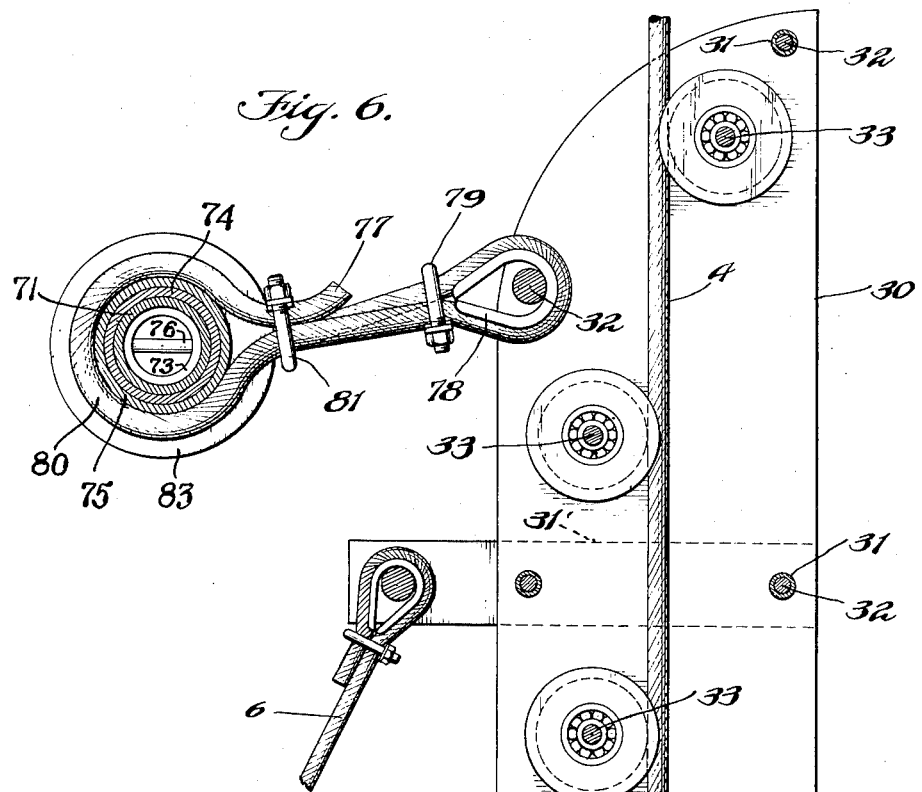
Figure 6 is a detailed view, partly in section, of a shoe.

Captive parachutes, arranged for free movement vertically but restrained from lateral movement, have been used heretofore in the training of parachute jumpers and also as amusement devices. Such parachutes are used in conjunction with a tower or similar elevated device which serves as a support for the upper ends of a plurality of guide wires that are disposed vertically and securely anchored at their bottom ends. The guide wires are stretched taut. The parachutes consist of a generally circular canvas structure which is attached at its outer edge to a rigid ring, usually composed of metal tubing. Guide shoes are threaded on the guide wires and connected to this rigid ring. Suspended below the ring is a passenger carrying means which in the case of an amusement device may consist of a seat wide enough to accommodate two passengers and equipped with a back rest, a safety belt and other safety devices as required. In the case of a parachute used for training purposes, the passenger carrying means may be the usual harness worn by the parachute jumper.

In the operation of a device of this kind, the parachute is elevated to the top of the guide wires by means of a cable attached to the apex of the canvas parachute. The cable is connected to the parachute by a coupler which is arranged to automatically uncouple when the top of the guide wires is reached. The shoes are arranged to guide the parachute in a vertical path downward with a minimum of retarding action due to the shoes, so that the descent of the parachute is checked only by the air scooped up by the parachute itself.

In an amusement park where a parachute of this type is used as an amusement device, provisions must be made to bring the parachute to rest at the bottom of its descent sufficiently gradually to eliminate the possibility of injury to the passengers and to lessen the wear and tear upon the parachute and associated mechanism. Many arrangements of which I am aware have been employed for this purpose. In one instance, the guide wires by which the parachutes are guided were not disposed truly vertical but rather were spread farther apart at the ground than at the top of the parachute tower. The theory of this arrangement was that as the parachute descended, the slant in the wires would tighten up on the shoes thereby increasing friction between the guide shoes and the wire to check the descent of the parachute. An arrangement of this kind to be effective must have such a large amount of spread to the guide wires and must place such an appreciable friction between the guide wires and shoes as to cause undue wear of the guide wire and shoes, making proper maintenance of the ride unduly expensive.

The present invention in one of its objects provides a totally different arrangement for bringing the descending parachute to rest in a pre-determined horizontal plane or normal position located sufficiently far above the ground that the passengers in the passenger carrying means will not strike the ground at the bottom of the ride. In accordance with the teachings of the present invention, the guide wires are disposed as truly vertical as it is possible to make them and are stretched tight so that they form truly vertical straight lines. The guide shoes are frictionless so that there is a minimum retarding action due to friction between the guide shoes and guide wire. Each guide wire carries a braking shoe which, when the parachute is above the stopping plane or normal position, is located on the guide wires at a considerable distance above that plane. The braking shoe is connected by suitable means to a source of braking resistance arranged to oppose movement of the shoe downwardly towards the plane in which the parachute is to be brought to rest. The zone through which the brakes are applied may be termed the braking zone.

In this arrangement as the parachute descends the guide shoes of the parachute engage the braking shoes at points from five to ten feet above the stopping point and descent is thereafter opposed by the resistance placed upon the braking shoe by the braking device. This braking resistance may be generated by fluid pressure means such as an air cylinder or a hydraulic shock absorber, either device being connected to the shoe through a suitable system of levers arranged to cause a relatively great movement of the braking shoe to produce a smaller movement of the fluid pressure means. The fluid pressure means is adjustable and is regulated so that the braking effort on the several brake shoes will be the same. With an arrangement of this kind, negative acceleration of the parachute is spread out over from five to ten feet of travel of the device and as a result the negative acceleration is made sufficiently gradual to minimize the shock of bringing the parachute to rest without injury to the passengers or parachute.

The distance between the braking shoes and stopping plane of the parachute and consequent distance or zone through which the brakes are applied, will depend upon the height of the guide wires and maximum speed the parachute is to travel. I have found that with a two hundred foot guide wire, a minimum braking zone of five feet is required to safeguard the passengers and parachute from injury, and that a braking distance of more than ten feet renders the ride unattractive to passengers. By using an adjustable hydraulic or pneumatic means as a source of braking pressure an advantage is gained. The device is set to produce satisfactory results at normal parachute speed. Should the parachute travel at a speed above this normal speed, as it will if the passengers are particularly heavy or the atmosphere particularly quiet, the braking effort will be automatically increased by the inherent characteristics of such devices. That is, in both hydraulic and pneumatic devices of this class, resistance is increased materially with an increase in the speed of operation, as is well understood by those skilled in the art.

After the parachute has been brought to rest in the normal position at the bottom of the guide wires, it is unloaded and reloaded and then elevated to the top of the wires in readiness for the next trip. As the parachute moves upwardly the braking shoes are caused to follow the guide shoes until their uppermost position is reached at from five to ten feet above the normal position, the pressure means by which braking resistance is applied to the shoes being arranged to have zero or very nearly zero resistance to upward movement of the shoes.

Referring now to the drawings in more detail, particularly Figure 1, it will be seen that the canvas parachute 1 is attached at its outer periphery to a rigid ring 2 which ring is in turn connected to guide shoes 3 that are threaded over suitable vertically disposed guide wires 4. The number of guide shoes 3 and the number of guide wires 4 may be varied within the teachings of the invention, however, four guide wires disposed 90 degrees apart have been found to produce very satisfactory results.

Extending from the guide shoes 3 and below the ring 2 are a plurality of strands 5 and 6, strands 5 being connected to a suitable member 7. Strands 6 are similarly connected to a member 7'. Members 7 and 7' may be suitable metallic rings and the strands may be wires or cables equipped with turn buckles, if desired. Rings 7 and 7' are preferably connected together by a generally horizontal member, which may be made rigid if desired.

A seat 9 is suspended below rings 7 and 7' by strain members 8 and 8' respectively, these members preferably being composed of webbing. The seat consists of a suitable frame 10 which carries a seat 9, that is wide enough to hold two passengers, a back rest 9', and a safety belt 11. The frame is securely fixed to strain members 8 and 8'.

As will be seen in Figures 1, 2 and 4, the guide wires 4 extend through stationary supports 12 which are shown as pipes. The guide wires extend into a pit 13, Figure 2, where they are connected to an anchor 14 by a turn buckle 15, the anchor being securely embodded in a body of concrete at the bottom of the pit. As shown in Figure 2, a wooden platform 16 extends over the top of the pit and serves as a support for the bottom of the pipe member 12, the pipe being fastened to the platform by a flange 17.

The four main support members 12 are connected together by suitable bracing means 18, Figure 5, which bracing means may well be cables held by means of turn buckles. Each main support 12 is anchored by a pair of guy wires 19 extending outwardly and downwardly to suitable anchors 20 located at some distance outwardly from the supports. Guy wires 19 may be provided with turn buckles 21 by which they are kept taut.

By this arrangement a rigid support is provided at the bottom of the guide wires 4, the support extending above the ground to establish a plane or normal position in which the parachute and ring are to be stopped, as will presently appear. Although the supports 12 are shown as pipes in the drawings, this particular arrangement is shown by way of example only as other suitable structural members, such as channels or angles may be used within the teachings of the invention.

As will be seen in Figures 1 and 2 a coil spring 22 is placed around each guide wire 4 at the top of the rigid support 12. These springs are adapted to be compressed by the descending brake shoes to thereby assist in bringing the parachute to rest, as will presently appear.

As will be seen in Figures 1, 6 and 7, the guide shoes 3 consist of substantially rectangular plates 30 which are held apart in substantially parallel relation by a plurality of spacers 31 and held together by bolts or rivets 32 extending through the spacers. A plurality of bolts 33 are extended between the plates 30 and each serves as a hub for the stationary race 34, Figure 4, of a ball-bearing assembly. Suitable spacing means 35 bear against the stationary race of the ball-bearing assembly and serve to center that assembly in the space between the plates 30, and to hold the stationary race against movement on the bolt 33. A castellated nut 36 is threaded upon the bolt 33 and held by a cotter pin 37 to securely lock the assembly together. The moving race 38 of the ball-bearing assembly serves as a hub for a fibre disc 40, which disc has in its periphery a groove 41 shaped to engage and fit over the guide wire 4.

As will be seen in Figure 6, the bolts 33 are located in the plates 30 so as to permit the guide wire 4 to pass through the shoe and to engage the guide pulleys therein without being bent out of a straight line. While four guide pulleys are shown in the drawings, a greater or lesser number may be used if desired within the teachings of the invention. The use of four rollers in the shoe with the rollers staggered as shown is advantageous. The top and bottom rollers are located so as to best resist forces tending to turn the shoe on the guide wires. These wires are preferably stranded cables or wire ropes and should one or more strands break and unravel from the remainder of the strands the shoes will still pass over the cable without snarling or catching.

The cable by which the ring 2 is connected to the shoe is connected near the top of the shoe, as will presently appear, and the strands 5 and 6 are connected at the middle of the shoe. The strands are clamped around a suitable thimble through which one of the spacers 31 is threaded. Preferably a steel strap 31' is placed on the outside face of each plate 30 to connect with the spacer 31 and rivet 32 on the opposite side of the shoe so as to distribute the stress placed on the shoe by the strands.

Fixed to the bottom of each shoe is a bumper place 42 which may be in the form of a disc which is perforated to permit the wires 4 to pass through it without touching. This plate 42 may be secured to the plates 30 in any preferred manner such as by welding. The guide shoes 3 are preferably constructed of a light weight alloy such as duraluminum so as to reduce the weight of the shoe.

As will be seen best in Figures 2, 3 and 4 a generally T-shaped bracket 50 is mounted upon each one of the supports 12 by suitable U-bolts 51. Parallel levers 52 and 53 are pivotally connected to the bracket 50 and extended outwardly therefrom. Pivotally connected to the outer ends of the levers 52 and 53 is a brake rod 54 which extends upwardly and is connected to bracket 55 that projects outwardly from a brake shoe 56. The brake shoe may be constructed in the same manner as the guide shoe shown in Figure 6, however since the weight of the shoe is not so important, preferably iron or steel are used instead of a more expensive alloy. A clamped collar 57 engages the support 12 near the top thereof and serves as an anchor for one end of a coil spring 58, the other end of which is attached to the levers 52 and 53 by a suitable hook 59. As the guide shoe 3 is raised on the guide wire spring 58 rotates levers 52 and 53 in a counterclockwise direction, Figure 2, to elevate the brake shoe and lever into the position in which they are shown in Figure 1.

Mounted upon the support 12 below the bracket 50 is a second generally L-shaped bracket 60 which serves as a mounting support for a source of fluid pressure 62. As shown in the drawings, the source of fluid pressure 62 is a single acting hydraulic shock absorber of the type commonly employed on automobiles, trucks, busses and the like. This shock absorber consists of a stationery portion mounted upon the bracket 60 and a movable arm 63.

Within the stationary portion of the shock absorber is a quantity of fluid, usually oil, and means carried on the movable arm for circulating that oil through a restricted port as the arm is moved in one direction. This restricted port is controlled externally by a needle valve usually located within the pivot rod on which the movable arm 63 is located. When the arm is moved in a reverse direction the restricted port is by passed and there is little or no restraint on the movement. Devices of this kind are available on the open market and are well understood by those skilled in the art.

The arm 63 is connected to levers 52 and 53 by a shock absorber rod 64. Bracket 60 also carries a stop arm 65 which is engaged by the shock absorber arm 63 to limit the upward movement of that arm, thereby to limit the upward movement of levers 52 and 53 and the brake shoe 56.

The length of levers 52 and 53, and the distance from the pivot of these levers to the point of attachment of rod 64, determines the travel that the brake shoe 56 can make upon the guide wire 4, since the maximum amount of movement of the arm 63 is fixed. Levers 52 and 53 are made long enough to permit the shoes to move at least five feet, in the preferred embodiment of the invention.

As will be seen in Figure 6, the brake shoe 56 carries a plate 66 which is similar to the bumper plate 42 and serves as a support for a bushing or collar of resilient material 67 which may conveniently be rubber. The plate 66 and the resilient material 67 are perforated with an opening 68 which is large enough to permit the guide wire 4 to pass through them freely.

The guide ring 2, Figure 1, is composed of a number of arcuate sections, corresponding in number of guide wires 4, that is where four guide wires are used, the ring will consist of four sections joined together at the guide wires. The ring serves to hold the parachute open so that there will be no uncontrolled drop when it is released, and since the ring travels with the parachute it must be as light as possible. In the preferred embodiment of the invention, the ring is composed of a high tensile strength alloy tubing known as aircraft tubing, which is quite satisfactory both as to strength and weight.

Figure 8:
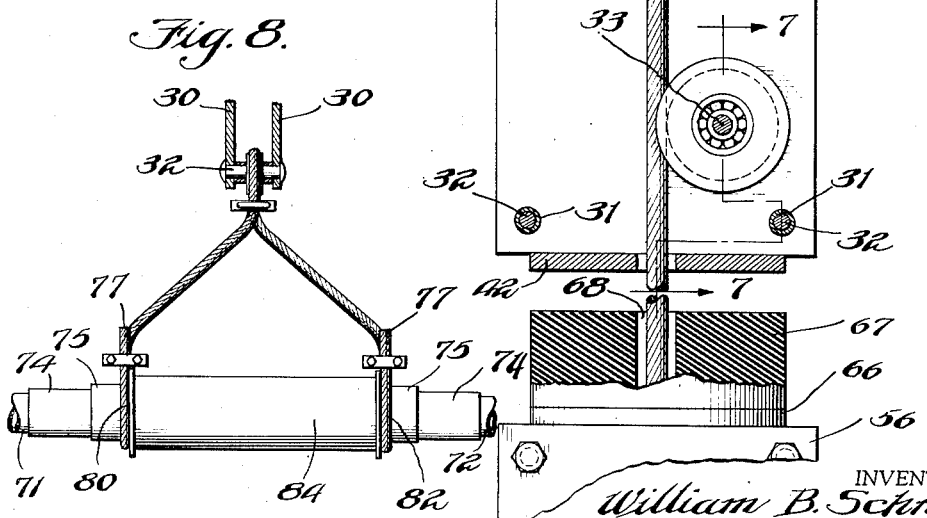
Figure 8 is a fragmentary elevational view showing the attachment of the guide shoes to the guide ring.

As will be seen in Figures 8 and 9 adjacent sections 71 and 72 of the ring are abutted together over a short piece of tubing 73 adapted to fit inside of the ends of the sections. The joint thus formed is engaged in a long piece of tubing 74 which is centered on the joint and extends a considerable distance on either side thereof over the outside faces of sections 71 and 72. A shorter piece of tubing 75 fits around the outside of tube 74, being centered thereon and on the abutting ends of the sections 71 and 72. The joint thus formed is held together by a plurality of rivets 76 which extend through the joint in the plane of the ring, that is, with the ring horizontal as shown in Figure 1 the rivets will be horizontal, thereby engaging the tubular sections 71 and 72 at points of minimum stress.

As will be seen in Figures 6, 7, and 8 a length of cable 77 is threaded around a thimble 78 that is threaded around one of the spacers 31 in the shoe, the cable being clamped on the thimble by a suitable U-clamp 79. One free end 80 of the cable encircles the ring near one end of the tube 75, being clamped thereon by a suitable U-clamp 81. The other end 82 of the cable 77 encircles the tubing 75 near its opposite end being similarly clamped. The ring is thus connected to the guide shoe 3. The cables are not rigidly connected to the tubing 75 but rather are capable of limited movement therealong, each cable loop being abutted against a suitable washer 83 which washers are spaced apart by a section of resilient material 84 which may be either a section of rubber tubing, as shown in Figure 8, or a coil spring.

In the operation of the device, the parachute is elevated to the top of the guide wires 4, by means not shown in the drawings as it forms no part of the present invention, and then released and allowed to descend on the guide wires. Brake shoes 56 are then located on the guide wires in the position shown in Figure 1 and as the guide shoe 3 moves downwardly bumper plate 42 engages the resilient block 67 to connect the two shoes together. Each brake shoe 56 is adjusted so as to be at the same height above the supports 12 as the other shoes, so that when the parachute descends with the ring 2 in a horizontal plane, as it will normally, the guide shoes 3 all engage their respective brake shoes simultaneously. Further descent of the parachute forces the brake shoes downwardly on the guide wires against the resistance of the fluid pressure means 62, the upward pressure put on the brake shoes by that means being transmitted through the shoe 3 and cable 77 to the ring 2. This movement of the brake shoes defines a braking zone which is sufficiently long to check the speed of the parachute gradually.

During the time that the guide shoes 3 are engaged with and moving the brake shoes 56 downwardly, the weight of the passengers and their inertia is transmitted through strain members 5 and 6 to the guide shoes. During this interval the guide ring is suspended at the four points of attachment of the guide shoes to it, the strains being distributed along the ring through the actions of reinforcing tubing 74 and 75. The impact upon the ring 2 occasioned as the guide shoes engage the brake shoes and the cables 77 pull taut, is cushioned by the sliding of loops 80 and 82 on the tubing 75 and against the tension of resilient means 84. By this arrangement danger of snapping the ring is minimized.

As the downward movement of braking shoes 56 continues coil springs 22 are engaged and serve to add additional force upwardly on the brake shoes to form a stopping means for bringing the assembly to rest in a normal position. Preferably when brought to rest the seat 9 will be high enough off the ground that a passenger sitting in it cannot touch the ground.

As soon as the passengers who have thus completed their ride have been replaced by others, the parachute is elevated and springs 58 serve to restore the braking mechanism to the normal position in which it is shown in Figure 1.

While I have shown a source of braking pressure as a hydraulic type shock absorber connected to the brake shoes through a system of levers, I have done so by way of example only as other arrangements may be used. The only essential feature of the braking arrangement is that the shoe shall be disposed in a normal position on the guide wire at a considerable distance above the final stopping point, and an arrangement of air cylinders, or weights and pulleys and the like which will produce this result, may be used in lieu of the fluid pressure means shown by way of example.

The braking arrangement of my invention is possessed of many advantages. The supports are rigid and self braced so that there is no danger of them flying loose and injuring a passenger or bystander. The braking arrangement is simple, inexpensive to construct and maintain and effective to bring the passengers to rest with sufficient gentleness to insure that they will not be injured. The guide wires being perfectly vertical and the guide shoes being constructed for low friction engagement with the wires permits the parachute to descend with sufficient speed to make the ride interesting and attractive to patrons. The guide wires serve a dual purpose namely guiding the parachute and guiding the brake shoes. The guide shoes and brake shoes are arranged so that a snarl will not result from the breaking of a strand in the guide wires.

Having thus complied with the statutes and shown and described a preferred embodiment of my invention, what I consider new and desire to have protected by Letters Patent is pointed out in the appended claims.

What is claimed is:

1. Braking means for a free falling captive parachute adapted to bring the parachute to rest at a predetermined point comprising, a plurality of brake shoes, means for supporting said shoes at a distance of several feet above said predetermined point, said parachute in descending engaging said brake shoes and moving the same down toward said predetermined point, brake means connected to said shoes through said supporting means for applying braking pressure to said shoes during said downward movement of the shoes, and means engaged by said brake shoes for bringing said parachute to rest at said predetermined point.

2. In combination with a free falling parachute having guide means for limiting the parachute to vertical movements, braking means for bringing the parachute to rest at a predetermined point comprising, a plurality of brake shoes, means for supporting said shoes at a distance of several feet above said predetermined point, said shoes being engaged by said guide means as the parachute descends and moved thereby toward said predetermined point, brake means connected to each of said shoes through the supporting means therefor for applying braking pressure to the shoe during its downward movement, and means engaged by said brake shoes for bringing said parachute to rest at said predetermined point.

3. In combination, a parachute having passenger carrying means, a plurality of vertically disposed guide wires, guide shoes fixed to said parachute and engaging said wires to confine the parachute to vertical movements, brake means for retarding the descent of the parachute toward a normal position including a brake shoe encircling each of said wires, said guide shoes engaging said brake shoes at points above said normal position and moving the brake shoes toward said normal position as the parachute descends, and means for applying pressure on said brake shoes against which pressure the shoes are moved into said normal position.

4. In combination with a parachute, a plurality of guide wires, means engaging the parachute and wires for guiding the parachute along the wires, means disposed in juxtaposition to the wires for determining a stopping point for said parachute, and braking means, normally disposed on said wires at points several feet above said point for bringing the parachute to rest.

5. In combination with a parachute, a plurality of guide wires, means engaging the parachute and guide wires for guiding the parachute therealong, rigid supports in juxtaposition to said wires, said supports determining a stopping point for the parachute, and braking means for bringing said parachute to rest, said means including shoes engaging said wires and engaged by said parachute guiding means several feet above said stopping point.

6. In combination with a parachute adapted to be elevated and then released and having passenger carrying means, a rigid ring connected to said parachute to hold the same open, a plurality of vertical guide wires disposed on a circle concentric with said ring and having a diameter greater than the diameter of said ring, a guide shoe fitted on each one of said guide wires and capable of free movement therealong, means connecting said guide shoes to said ring, a brake shoe fitted upon each one of said wires below said guide shoes and capable of free movement therealong, means for retarding the downward movement of said brake shoes thereby to retard descent of said ring and parachute, and means surrounding each guide wire and engaged by the brake shoe, said means exerting pressure on said brake shoes thereby to bring the parachute and ring to rest.

7. In combination with a parachute adapted to be elevated and then released and having passenger carrying means, a rigid ring connected to the parachute to hold the same open, a plurality of vertical guide wires disposed on a circle concentric with said ring and having a diameter greater than the diameter of said ring, a guide shoe fitted upon each one of said guide wires and capable of free movement therealong, means connecting said guide shoes to said ring, a brake shoe fitted upon each one of said guide wires below said guide shoes and capable of free movement therealong, means including a fluid pressure brake for retarding the downward movement of said brake shoes thereby to retard descent of said ring and parachute, and means in juxtaposition to said wires for bringing said parachute to rest.

8. In a captive parachute ride, a parachute having passenger carrying means, a plurality of vertically disposed guide wires, a guide shoe fixed on said parachute and engaging each one of said wires, said guide shoes and wires confining said parachute to vertical movements, stop means for determining a normal position from which said parachute is elevated vertically and then released to permit free descent, brake means for retarding descent of said parachute as said normal position is approached comprising, a brake shoe engaging each of said guide wires, means for supporting said shoes on said wire at an appreciable distance above said stop means, said guide shoes engaging said brake shoes and moving them downwardly on said guide wires as the parachute descends, and means in said supporting means for resisting the downward movement of the brake shoes thereby to retard the descent of the parachute.

9. In combination with a parachute adapted to be elevated and then released and having passenger carrying means, a rigid ring connected to said parachute, a plurality of vertical taut guide wires disposed around said ring and extending upwardly from the ground, a guide shoe on each of said guide wires, means connecting said guide shoes to said ring, a support extending upwardly from the ground in juxtaposition to each one of said guide wires, brace means connected to and extending between adjacent ones of said supports, guy means connected near the top of each of said supports and to anchors located outside of a circle defined by the supports, said brace means and guy means together holding said supports rigid, a brake shoe on each guide wire below the guide shoe thereon, brake means on each support connected to the associated brake shoe and arranged to resist downward movement of the shoe on the wire thereby to retard descent of the parachute and ring and to bring the ring to rest on the tops of said supports.

10. In combination with a parachute adapted to be elevated and then released and having passenger carrying means, a rigid ring connected to the parachute to hold the same open, a plurality of vertical guide wires spaced uniformly around said ring, a guide shoe fitted upon each one of said guide wires and capable of free movement therealong, a brake shoe fitted upon each one of said guide wires below said guide shoes and capable of free movement therealong, a resilient bumper fixed upon each brake shoe for cushioning impacts between the guide shoe and brake shoe, a fixed support extending from the ground upwardly alongside of each one of said guide wires, brake means mounted upon each one of said supports, and means connecting said brake means to the associated brake shoe to retard the downward movement of the brake shoe thereby to retard descent of said ring and parachute.

11. In combination with a parachute adapted to be elevated and then released and having passenger carrying means, a rigid ring connected to the parachute to hold the same open, a plurality of vertical guide wires spaced uniformly around said ring, a guide shoe fitted upon each one of said guide wires and capable of free movement therealong, a brake shoe fitted upon each one of said guide wires below said guide shoes and capable of free movement therealong, a resilient bumper fixed upon each brake shoe for cushioning impacts between the guide shoe and brake shoe, a fixed support extending from the ground upwardly alongside of each one of said guide wires, brake means mounted upon each one of said supports and linkage means connecting said brake shoe to said brake means, said linkage means permitting a movement of the brake shoes downwardly on the guide wire to be resisted by a lesser movement of the brake means to retard the descent of the ring and parachute.

12. In combination with a parachute adapted to be elevated and then released and having passenger carrying means, a rigid ring connected to the parachute to hold the same open, a plurality of vertical guide wires spaced uniformly around said ring, a guide shoe fitted upon each one of said guide wires and capable of free movement therealong, a brake shoe fitted upon each one of said guide wires below said guide shoes and capable of free movement therealong, a resilient bumper fixed upon each brake shoe for cushioning impacts between the guide shoe and brake shoe, a fixed support extending from the ground upwardly alongside of each one of said guide wires, brake means mounted upon each one of said supports, lever means pivotally mounted upon each one of said supports, link means connecting each lever to the associated brake means, rod means connecting said lever to the associated brake shoe, said means applying pressure to the brake shoe to retard the downward movement of the brake shoe, guide shoe, ring and parachute, means engaging each lever and the support upon which it is mounted for rotating the lever to slide the brake shoe upwardly upon the guide wire as the parachute is elevated, and stop means for limiting the upward movement of said brake shoe and lever.

13. In combination with a parachute adapted to be elevated and then released and having passenger carrying means, a rigid ring connected to the parachute to hold the same open, a plurality of vertical guide wires spaced uniformly around said ring, a guide shoe fitted upon each one of said guide wires and capable of free movement therealong, a brake shoe fitted upon each one of said guide wires below said guide shoes and capable of free movement therealong, a resilient bumper fixed upon each brake shoe for cushioning impacts between the guide shoe and brake shoe, a fixed support extending from the ground upwardly alongside of each one of said guide wires, brake means mounted upon each one of said supports, a lever pivotally mounted upon each support and extending outwardly therefrom, link means connecting each lever to the associated brake means, a rod connected to the free end of each lever and to the brake shoe on the associated guide wire, the linkage formed by said lever, link and rod permitting a long movement of the brake shoe downwardly on the guide wire to be resisted by a shorter movement of the brake means thereby to retard descent of the ring and parachute, and resilient stopping means fixed upon each support and adapted to engage the associated brake shoe to bring the same to rest near the top of the support thereby to bring the ring and parachute to rest at a definite elevation above the ground.

14. A ring for parachutes comprising a plurality of arcuate sections of metal tubing, a short piece of metal tubing fitted within the adjacent ends of adjacent sections to fit them together, a reinforcing sleeve fitted over the outside of the adjacent ends of adjacent sections, a second and shorter reinforcing sleeve fitted over the outside of said first reinforcing ring and centered thereon and on the junction of said adjacent ends of said sections, rivets extending through said tubing and sleeves in the plane of the ring for holding the same together, a plurality of guide shoes, a pair of cables fixed to each shoe and encircling one of said second reinforcing sleeves to attach the shoe to the ring at the sections, and a flexible tubing encircling each of said second reinforcing tubings between said cables to cushion stresses placed upon the ring by the cables.

15. In combination with a parachute adapted to be elevated and then released and having passenger carrying means, a rigid ring connected to the parachute to hold the same open, means including a plurality of guide wires for limiting said parachute to vertical movements, a plurality of vertically disposed supports rising from the ground and terminating thereabove to determine a normal position for said parachute, braking means adapted to apply pressure to said parachute through said ring to retard the descent of said parachute toward said normal position, and means mounted upon said supports for bringing said parachute to rest in said normal position.

16. In combination with a parachute adapted to be elevated and then released and having passenger carrying means, means connected to the parachute for holding the same open, a plurality of guide wires, a guide shoe on each wire movable therealong and connected to said parachute to limit the same to vertical movements, a plurality of supports rising from the ground, means including coil springs fixed upon said supports to determine a stopping zone for said parachute, a plurality of brake shoes, means for holding said brake shoes at a fixed distance above said stopping zone, said means permitting said shoes to be pushed downwardly by said parachute into said stopping zone, and means for resisting said downward movement of said shoes to determine a braking zone in which descent of said parachute is retarded.

WILLIAM B. SCHMIDT.